US012558830B2

(12) United States Patent
Iuliano et al.

(10) Patent No.: US 12,558,830 B2
(45) Date of Patent: Feb. 24, 2026

(54) APPARATUS AND METHOD FOR EXTRUDING A FLUID MATERIAL

(71) Applicant: NORDSON CORPORATION, Westlake, OH (US)

(72) Inventors: Salvatore Giovanni Iuliano, Eau Claire, WI (US); Michael Kenneth Truscott, Chippewa Falls, WI (US); Brandon James Schultz, Chippewa Falls, WI (US); Gerrit Van de Rostyne, Overmere (BE); Cathy Gomez, Alsemberg (BE); Günther Lambrecht, Assenede (BE)

(73) Assignee: Nordson Corporation, Westlake, OH (US)

( * ) Notice: Subject to any disclaimer, the term of this patent is extended or adjusted under 35 U.S.C. 154(b) by 173 days.

(21) Appl. No.: 18/253,845

(22) PCT Filed: Dec. 9, 2021

(86) PCT No.: PCT/US2021/062517
§ 371 (c)(1),
(2) Date: May 22, 2023

(87) PCT Pub. No.: WO2022/125724
PCT Pub. Date: Jun. 16, 2022

(65) Prior Publication Data
US 2024/0017461 A1     Jan. 18, 2024

Related U.S. Application Data

(60) Provisional application No. 63/123,591, filed on Dec. 10, 2020.

(51) Int. Cl.
*B29C 48/305*     (2019.01)
*B29C 48/08*     (2019.01)

(52) U.S. Cl.
CPC ............ *B29C 48/305* (2019.02); *B29C 48/08* (2019.02)

(58) Field of Classification Search
CPC ...... B29C 48/305; B29C 48/31; B29C 48/313
See application file for complete search history.

(56) References Cited

U.S. PATENT DOCUMENTS 3,680,997 A * 8/1972 Dukert ................ B29C 48/2556
425/192 R
4,043,739 A * 8/1977 Appel .................... B29C 48/05
425/461

(Continued)

FOREIGN PATENT DOCUMENTS

CN     102601967 A     7/2012
CN     104169062 A     11/2014
(Continued)

*Primary Examiner* — Timothy Kennedy
(74) *Attorney, Agent, or Firm* — BakerHostetler

(57) ABSTRACT

An extrusion die has first and second die bodies that define an extrusion cavity therebetween. The extrusion cavity has an inlet, a primary manifold that extends from the inlet along a flow direction, and an outlet that defines an elongate slot. In some examples, cavity has an intermediate chamber that extends from the primary manifold along the flow direction, the intermediate chamber having a back line and a front line that taper away from one another as they extend outwards towards opposing ends of the die. The primary manifold has a front end portion that is defined between opposing inner surfaces, at least one of inner surface tapering towards the other as it extends along the flow direction. In some examples, the inner surface has first and second curved portions that curve to provide a smoother transition from the primary manifold to a downstream chamber of the extrusion cavity.

27 Claims, 9 Drawing Sheets

(56) References Cited

U.S. PATENT DOCUMENTS

| | | | | |
|---|---|---|---|---|
| 4,372,739 | A | | 2/1983 | Vetter et al. |
| 4,619,802 | A | * | 10/1986 | Cloeren .................. B29C 48/08 |
| | | | | 425/467 |
| 5,120,484 | A | * | 6/1992 | Cloeren ................ B29C 48/305 |
| | | | | 425/133.5 |
| 5,234,330 | A | * | 8/1993 | Billow .................. B05C 5/0254 |
| | | | | 425/467 |
| 5,234,649 | A | * | 8/1993 | Cloeren ............. B29C 48/2556 |
| | | | | 425/133.5 |
| 5,256,052 | A | * | 10/1993 | Cloeren .................. B29C 48/07 |
| | | | | 425/467 |
| 5,494,429 | A | | 2/1996 | Wilson et al. |
| 6,383,425 | B1 | * | 5/2002 | Wu ....................... B29C 44/505 |
| | | | | 264/53 |
| 2003/0011100 | A1 | | 1/2003 | Fukumura |
| 2004/0238995 | A1 | | 12/2004 | Ulcej |
| 2010/0059903 | A1 | | 3/2010 | Elgindi |
| 2013/0259965 | A1 | | 10/2013 | Cloeren et al. |
| 2018/0036931 | A1 | | 2/2018 | Higuchi et al. |
| 2020/0207002 | A1 | | 7/2020 | Cloeren |

FOREIGN PATENT DOCUMENTS

| | | | | | |
|---|---|---|---|---|---|
| CN | 107848180 | A | | 3/2018 | |
| DE | 3503721 | C2 | * | 12/1993 | ............ B29C 48/12 |
| EP | 0646450 | A1 | | 4/1995 | |
| EP | 0767044 | A1 | | 4/1997 | |
| EP | 1484159 | A3 | | 12/2004 | |
| JP | 57-015926 | A | | 1/1982 | |
| JP | 04-137819 | U | | 12/1992 | |
| JP | 07-164505 | A | | 6/1995 | |
| JP | 09-109229 | A | | 4/1997 | |
| JP | 09-225990 | A | | 9/1997 | |
| JP | 2014-184719 | A | | 10/2014 | |
| TW | 202023791 | A | | 7/2020 | |

* cited by examiner

1

APPARATUS AND METHOD FOR EXTRUDING A FLUID MATERIAL

CROSS-REFERENCE TO RELATED APPLICATIONS

This application is a National Stage Application of International Patent App. No. PCT/US2021/062517, filed Dec. 9, 2021, which is hereby incorporated by reference in its entirety for all purposes as if fully set forth herein, and which claims the benefit from U.S. Provisional Application No. 63/123,591 filed on Dec. 10, 2020, which is hereby incorporated by reference in its entirety for all purposes as if fully set forth herein.

TECHNICAL FIELD

The present disclosure relates generally to an extrusion apparatus and more particularly to an extrusion die for extruding fluid materials and methods of using the same.

BACKGROUND

Conventionally, an extrusion die has been used to extrude molten thermoplastic into a film or sheet. An extrusion die has first and second die bodies that define an extrusion cavity therebetween through which the molten thermoplastic is extruded. The extrusion cavity has a die inlet, a die outlet, and one or more chambers between the die inlet and the die outlet that distribute the molten thermoplastic from the die inlet to the die outlet. For example, in one conventional type of extrusion die, the extrusion cavity has a die inlet, a coat hanger-shaped primary manifold downstream of the die inlet, a triangular preland portion downstream of the primary manifold, a melt well (otherwise referred to as a secondary relief or secondary manifold) downstream of the preland portion, and a die outlet downstream of the melt well. The preland portion provides resistance to flow which varies over the width of the die so that the flow of thermoplastic is uniformly transversely spread out. The die outlet can be defined between opposed lips of the extrusion die, at least one of which can be adjustable to adjust the lip gap (e.g., a depth thereof) of the die outlet.

In U.S. Pat. No. 5,949,429, the teachings of which are hereby incorporated by reference herein, an extrusion die is disclosed that is implemented with a primary manifold having a back line that is parallel to the die outlet such that a distance between the back line and the die outlet is constant across a width of the extrusion die. The linear back line enables the first and second die bodies to be fastened to one another by fasteners that are spaced from one another along a line that is parallel to both the back line and the die outlet. Spacing the fasteners in such a manner can make the extrusion die less susceptible to deflection changes, such that the deflection (if any) is more uniform across a width of the extrusion die. This, in turn, can reduce the need to adjust the lip or lips that define the die outlet in order to obtain a desired profile of the extruded sheet.

SUMMARY

In an example, an extrusion die comprises a first die body and a second die body that define an extrusion cavity therebetween. The extrusion cavity has an inlet, a primary manifold, an intermediate chamber, and an outlet. The primary manifold extends from the inlet along a flow direction. The primary manifold has a back line, and a front line that is spaced from the back line along the flow direction. The back line is substantially linear along a second direction, perpendicular to the flow direction, as the back line extends outwards towards first and second ends of the extrusion die that are spaced from one another along the second direction. The front line is tapered towards the back line as the front line extends outwards towards the first and second ends. The intermediate chamber extends from the primary manifold along the flow direction. The intermediate chamber has a back line that is coextensive with the front line of the primary manifold, and a front line that is spaced from the back line of the intermediate chamber along the flow direction. The front line of the intermediate chamber is tapered away from the back line of the intermediate chamber as the front line of the intermediate chamber extends outwards towards the first and second ends. The intermediate chamber has a depth along a third direction, perpendicular to the flow direction and the second direction, that is less than a depth of the primary manifold. The outlet is in fluid communication with the primary manifold and the intermediate chamber, and the outlet defines a slot that is elongate along the second direction.

In another example, an extrusion die comprises a first die body and a second die body that define an extrusion cavity therebetween. The extrusion cavity has an inlet, a primary manifold, and an outlet. The primary manifold extends from the inlet along a flow direction. The primary manifold has a back end portion, and a front end portion that extends from the back end portion along the flow direction. The front end portion is defined by opposing front-end inner surfaces of the first and second die body, respectively. At least one of the opposing front-end inner surfaces tapers towards the other of the front-end inner surfaces as it extends along the flow direction. The at least one of the opposing front-end inner surfaces has a first curved portion that extends from the back end portion towards a front line of the primary manifold, and a second curved portion that extends from the front line towards the back end portion. The outlet is in fluid communication with the primary manifold along the flow direction, and defines a slot that is elongate along the second direction.

BRIEF DESCRIPTION OF THE DRAWINGS

The following description of the illustrative examples may be better understood when read in conjunction with the appended drawings. It is understood that potential examples of the disclosed systems and methods are not limited to those depicted.

DETAILED DESCRIPTION

In convention extrusion dies, such as dies in which the primary manifold has a back line that is parallel to the die outlet, the primary manifold can be too large in volume towards the ends of the extrusion die. This can result in longer residence times of the fluid being extruded therethrough, where the residence time is a measure of the time from when the fluid particles enter the extrusion die to the time that the particles exit the extrusion die. In some examples of this disclosure, an intermediate chamber is included that can reduce the volume of the primary manifold towards the ends of the extrusion die. This, in turn, can reduce residence time of the fluid in the extrusion die and can result in an extrusion die that produces a more uniform distribution of the fluid across a width of the extrusion die. In addition, or alternatively, in some examples, the primary manifold can be defined between opposing front inner surfaces. At least one of the opposing front surfaces can be tapered towards the other and can be implemented with at least one radius, such as a pair of radii. The radius or radii can result in less shear variation of the fluid flow as the fluid flows through the primary manifold. Further, the radius or radii can be implemented on a primary manifold having any suitable shape, including those with a parallel back line, a coat hanger shape, or any other suitable shape. The primary manifold with radius or radii can also be implemented in dies that do or do not have the intermediate chamber discussed above.

Figures 1, 2:
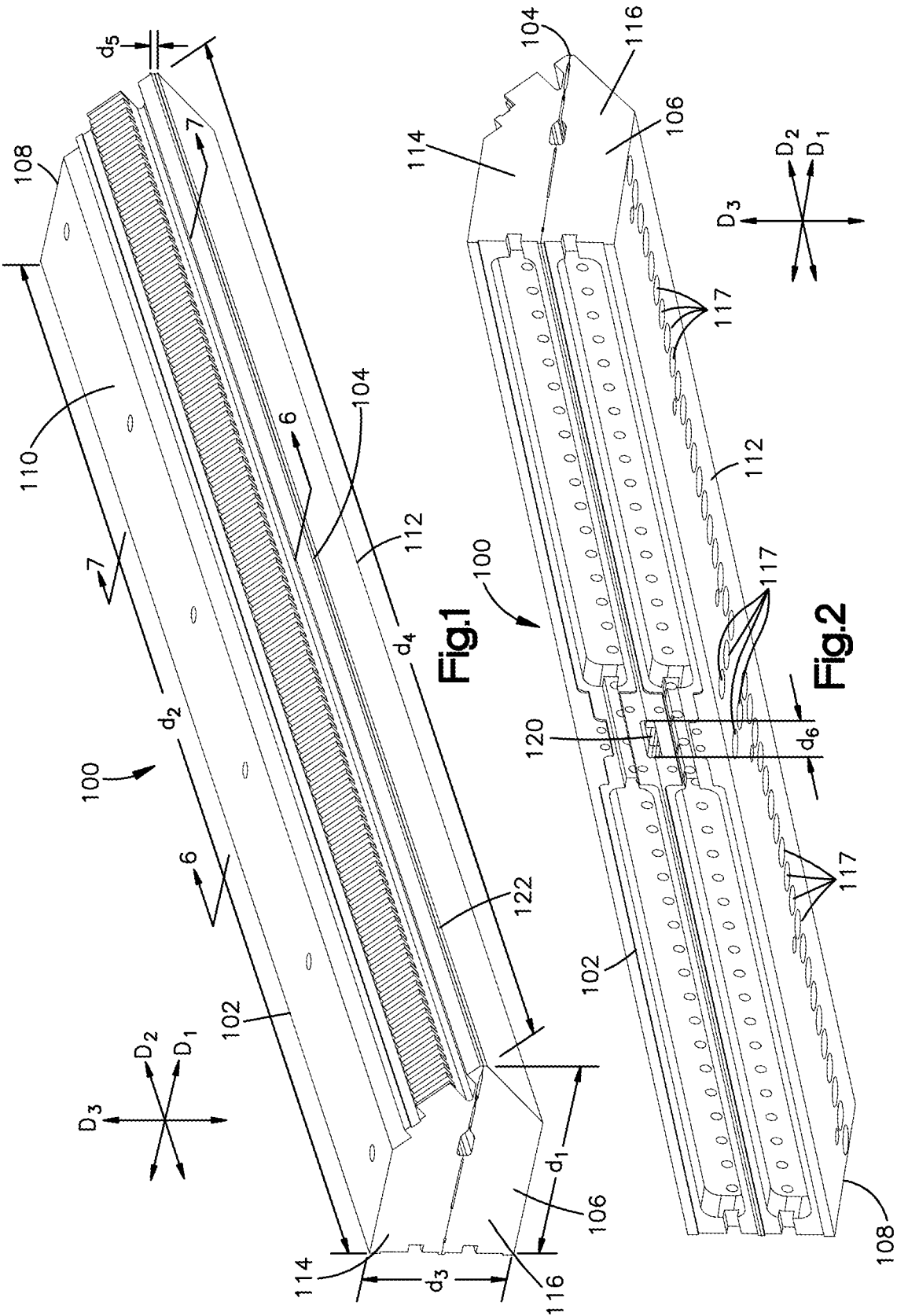
FIG. 1 shows a perspective view of an outlet side of an extrusion die apparatus according to one example.
FIG. 2 shows a perspective view of an inlet side of an extrusion die apparatus according to one example.

Referring to FIGS. 1 and 2, an extrusion die 100 is shown according to one example. The extrusion die 100 is configured to extrude a fluid, such as a polymer such as a monolayer or multilayer molten thermoplastic, therethrough to form film or sheet product. The extrusion die 100 has an inlet side 102 and an outlet side 104 that are spaced from one another along a first direction $D_1$. The outlet side 104 is spaced from the inlet side 102 along a flow direction, parallel to the first direction $D_1$, where the flow direction is the direction of flow from the inlet side 102 to the outlet side 104. The extrusion die 100 has a first end 106 and a second end 108 that are spaced from one another along a second direction $D_2$, perpendicular to the first direction $D_1$. The extrusion die 100 has a first side 110 and a second side 112 that are spaced from one another along a third direction $D_3$, perpendicular to the first and second directions $D_1$ and $D_2$. The extrusion die 100 can be elongate from the first end 106 to the second end 108. The extrusion die 100 can have a dimension $d_1$, such as a length, from the inlet side 102 to the outlet side 104, a dimension $d_2$, such as a width, from the first end 106 to the second end 108, and a dimension $d_3$, such as a thickness, from the first side 110 to the second side 112. The width $d_2$ can be greater than one or both of the length $d_1$ and the thickness $d_3$. In some examples, the length $d_1$ can be greater than the thickness $d_3$.

Figure 3:
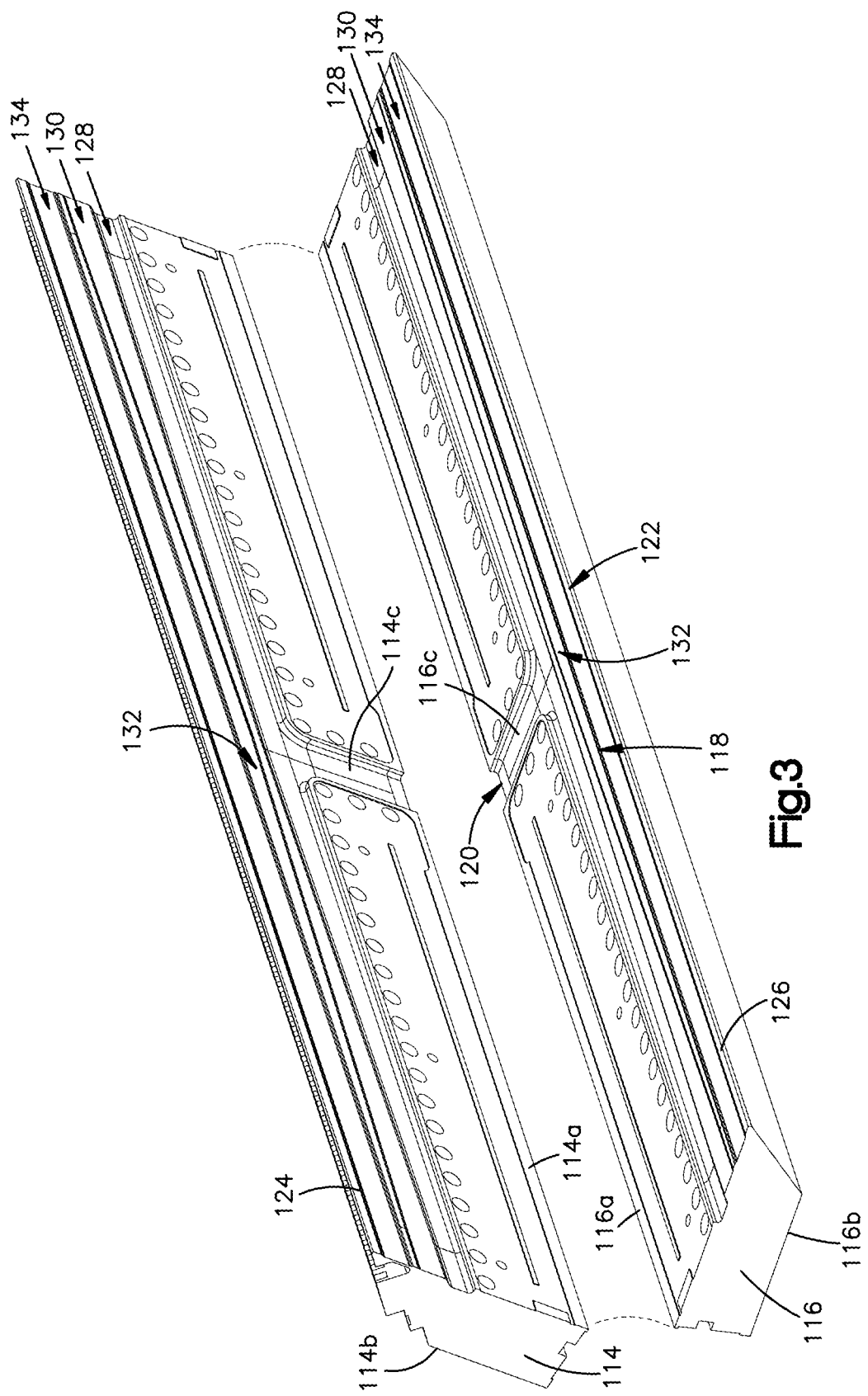
FIG. 3 shows an exploded perspective view of the extrusion die apparatus of FIG. 1.
Figures 4, 5:
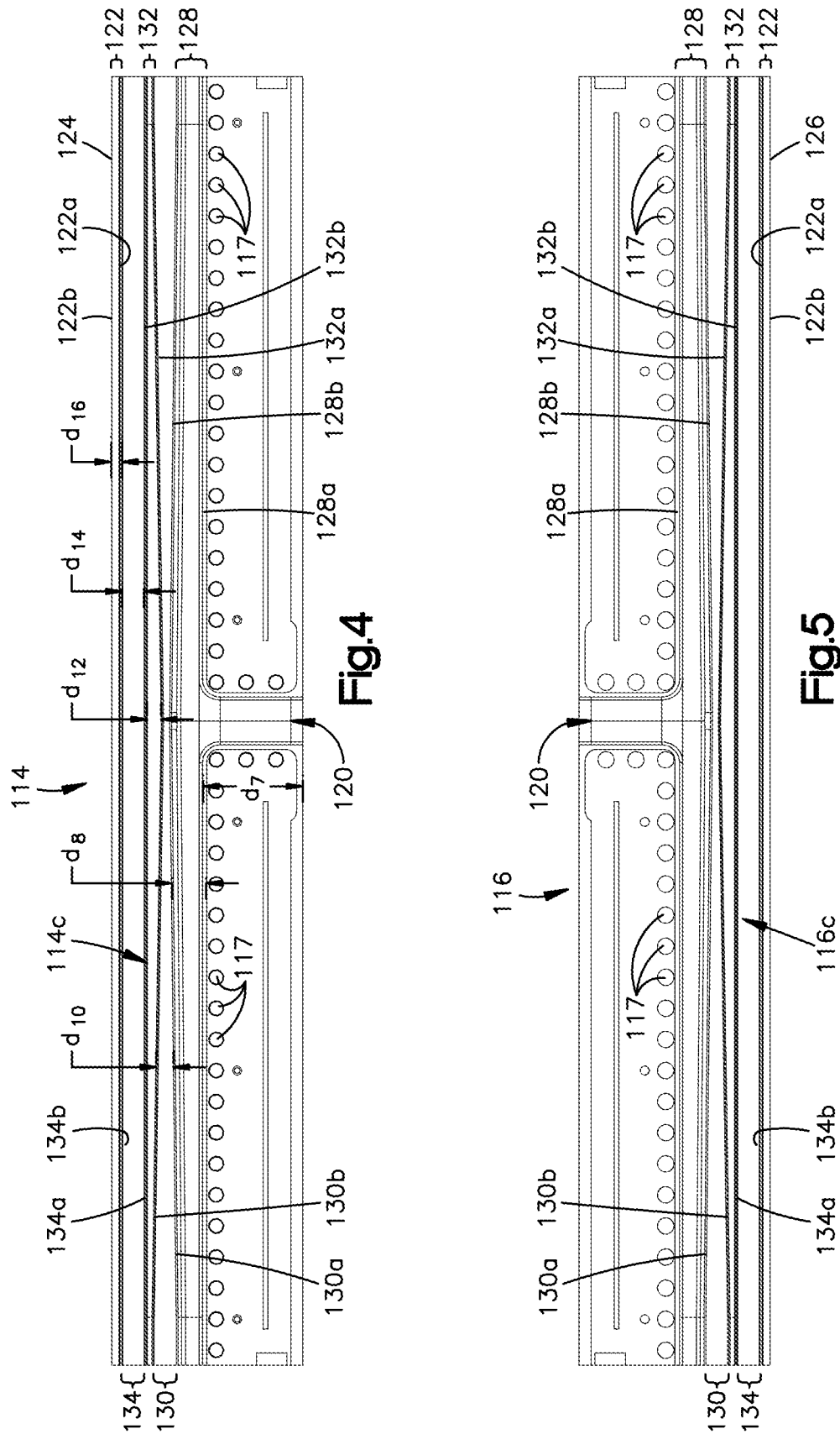
FIG. 4 shows a plan view of an inner side of a first die body of the extrusion die apparatus of FIG. 1.
FIG. 5 shows a plan view of an inner side of a first die body of the extrusion die apparatus of FIG. 1.

Referring to FIGS. 3 to 5, the extrusion die 100 comprises mating die bodies, such as a first die body 114 and a second die body 116. The first and second bodies can be offset from one another along the third direction $D_3$ when the first and second die bodies 114 and 116 are assembled together. The first and second die bodies 114 and 116 can be coupled to one another using any suitable fasteners. For example, the first and second die bodies 114 and 116 can comprise a plurality of attachment holes 117, and the extrusion die 100 can comprise a plurality of bolts (not shown), where each bolt is configured to extend into an attachment hole 117 of one of the first and second bodies 114 and 116 and into the attachment hole 117 of the other one of the first and second bodies 114 and 116 to secure the first and second bodies 114 and 116 to one another. When assembled, the first and second bodies 114 and 116 define an extrusion cavity 118 (labeled in FIGS. 6 and 7) therebetween. The first body 114 has an inner surface 114*a* and an outer surface 114*b* that are opposite one another along the third direction $D_3$. The inner surface 114*a* defines a first recess 116*c* therein that defines at least a first portion of the extrusion cavity 118.

Similarly, the second body 116 has an inner surface 116*a* and an outer surface 116*b* that are opposite one another along the third direction $D_3$. The inner surface 116*a* can define a second recess 116*c* therein that defines at least a second portion of the extrusion cavity 118. The inner surfaces 114*a* and 116*a* face one another when the first and second die bodies 114 and 116 are assembled together. When assembled, the first and second recesses 114*c* and 116*c* can together define the extrusion cavity 118. In some examples, the first and second recesses 114*c* and 116*c* can be substantial mirror images of one another, although not all examples of this disclosure are so limited.

The extrusion die 100 can define an inlet 120 and an outlet 122. The inlet 120 and outlet 122 can be offset from one another along the first direction $D_1$. The extrusion cavity 118 can extend from the inlet 120 to the outlet 122. The outlet 122 is configured to extrude fluid therethrough to form film or sheet product. The outlet 122 can be extend into the outlet side 104 of the extrusion die 100. The outlet 122 can be defined between a first lip 124 of the first die body 114 and a second lip 126 of the second die body 116 with respect to the third direction $D_3$. In other examples (not shown), the outlet 122 can be angled relative to the first direction $D_1$ such that the outlet extends along a direction that is between the first and third directions $D_1$ and $D_3$. The outlet 122 can define a lip gap having a dimension $d_4$, such as a width, along the second direction $D_2$, and a dimension $d_5$ along the third direction $D_3$. The dimension $d_5$ can be measured from the first lip 124 to the second lip 126. The width $d_4$ can be greater than the dimension $d_5$. Thus, the outlet 122 can define a slot that is elongate along the second direction $D_2$.

The inlet 120 can extend into the inlet side 102 of the extrusion die 100. The inlet 120 can have a dimension $d_6$, such as a width, along the second direction $D_2$ that is less than the width $d_4$ of the outlet 122. For example, the inlet 120 can have a width $d_6$ that is less than half of the width $d_4$ of the outlet 122, such as less than three eighths, such as less than a quarter, such as less than one eighth, of the width $d_4$ of the outlet 122. In some examples, the inlet 120 can be elongate along the first direction $D_1$. For example, the inlet 120 can have a dimension $d_7$, such as a length, along the first direction $D_1$ that is greater than both the width $d_6$ of the inlet 120 along the second direction $D_2$ and a depth of the inlet 120 along the third direction $D_3$. The inlet 120 is preferably substantially centered between the first and second ends 106 and 108 of the extrusion die 100 so as to permit the fluid to distribute evenly towards the first and second ends 106 and 108. Thus, the extrusion cavity 118 can be configured to spread the fluid out along the second direction $D_2$ as the fluid travels from the inlet 120 to the outlet 122.

With reference to FIGS. 3 to 5, the extrusion cavity 118 can comprise a plurality chambers. The chambers can be offset from one another along the third direction $D_3$. Each of the chambers can be elongate along the second direction $D_2$. For example, each of the chambers can have a dimension along the second direction $D_2$ that is greater than both a dimension of the chamber along the first direction $D_1$ and a dimension of the chamber along the third direction $D_3$. In some examples, each chamber can have a dimension along the second direction $D_2$ that is substantially equal to the width $d_4$ of the outlet 122.

The plurality of chambers of the extrusion cavity 118 can comprise a chamber, herein referred to as a primary manifold 128. In some examples, as shown in FIGS. 3 to 5, the plurality of chambers can comprise a chamber 130, herein referred to as an intermediate chamber, that is offset from the primary manifold 128 along a downstream direction. The downstream direction can extend from the inlet side 102 to the outlet side 104 and can be aligned with the first direction $D_1$. The plurality of chambers can comprise a chamber, herein referred to as a preland 132, that is offset from the primary manifold 128 (and the intermediate chamber 130 when implemented) along the downstream direction. Thus, the intermediate chamber 130 (when implemented) can be between the primary manifold 128 and the preland 132 along the first direction $D_1$. The plurality of chambers can comprise a chamber, herein referred to as a secondary manifold 134, that is offset from the preland 132 along the downstream direction. Thus, the preland 132 can be between (1) the intermediate chamber 130 (when implemented) or the primary manifold 128 (when the intermediate chamber 130 is not implemented) and (2) the secondary manifold 134 along the first direction $D_1$. The plurality of chambers can comprise the outlet 122, wherein the outlet 122 that is offset from the secondary manifold 134 along the downstream direction. Thus, the secondary manifold 134 can be between the preland 132 and the outlet 122 along the first direction $D_1$. It will be understood that, in alternative embodiments, the extrusion die 100 can be devoid of one or more of the aforementioned chambers or may comprise one or more chambers not disclosed above. In one alternative example, the extrusion die 100 can be devoid of the intermediate chamber 130.

The primary manifold 128 can extend from the inlet 120 towards the outlet 122 along the first direction $D_1$. Thus, the inlet 120 can terminate at the primary manifold 128. The primary manifold 128 is in fluid communication with the inlet 120, and is configured to disburse the fluid across a width of the extrusion die 100 along the second direction $D_2$. The primary manifold 128 can have a back line 128a and a front line 128b that are offset from one another along the first direction $D_1$. The back line 128a can extend from the inlet 120 along the second direction $D_2$, while the front line 128b can be spaced from the inlet 120 along the first direction $D_1$. At least a portion of the back line 128a can be linear along the second direction $D_2$. In preferred embodiments, an entirety of the back line 128a can be linear along the second direction $D_2$. The back line 128a can be substantially parallel to the outlet 122. Forming the back line 128a to be linear results in the ability to locate the attachment holes 117, and consequently the bolts holding the first and second die bodies 114 and 116, along the back line 128a at points equally spaced from the die outlet 122 without causing some bolts along the back line 128a to be spaced farther from the outlet 122 than others. This in turn can substantially reduce the risk of the first and second die bodies 114 and 116 separating at the manifold back line under pressure and prevent a leak from developing between the first and second die bodies 114 and 116 at the manifold back line.

The front line 128b of the primary manifold 128 can taper towards the back line 128a as the front line 128b extends outwards towards the first and second ends 106 and 108 of the extrusion die 100. The primary manifold 128 can have a dimension $d_8$, such as a length, along the first direction $D_1$ from the back line 128a to the front line 128b, where the length $d_8$ decreases as the primary manifold 128 extends towards the first and second ends 106 and 108. Thus, the length $d_8$ can be larger towards a center of the primary manifold 128 than it is towards the first and second ends 106 and 108. The primary manifold 128 can also have a dimension $d_9$, such as a height or depth, along the third direction $D_3$. The height or depth $d_9$ can decrease as the primary manifold 128 extends towards the first and second ends 106 and 108. It will be understood that, in alternative examples, the primary manifold 128 can have any other suitable shape in a cross-sectional plane that is perpendicular to the third direction $D_3$, such as a coat-hanger shape and a T-shape.

Figure 6:
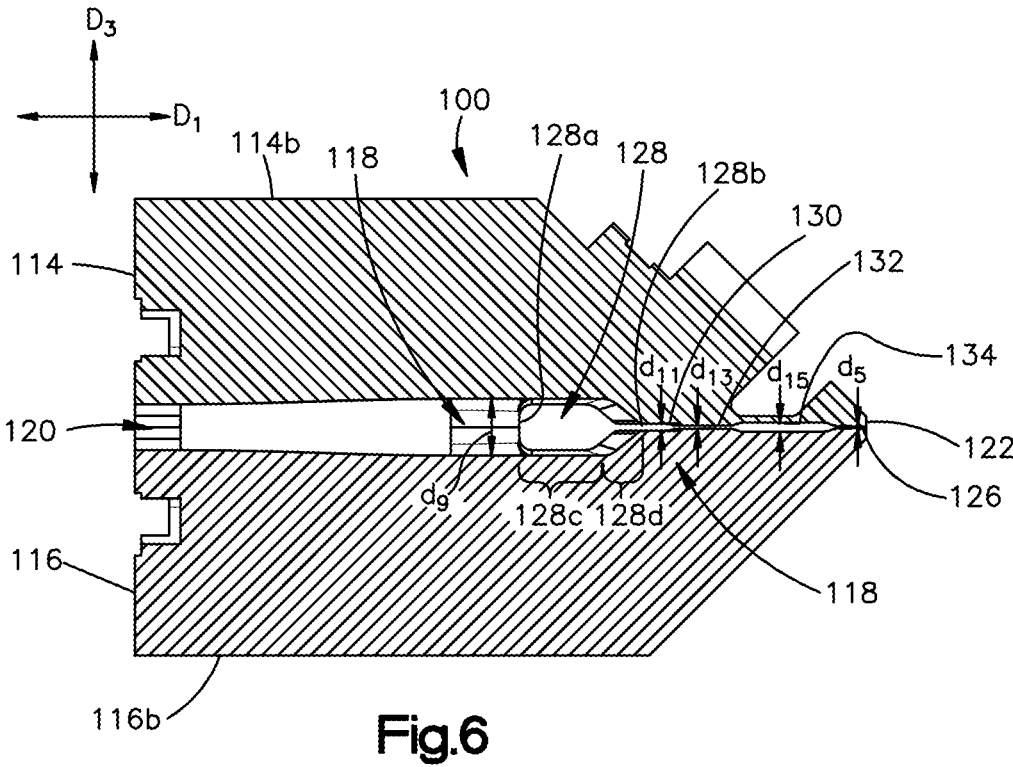
FIG. 6 shows a cross-sectional view of the extrusion die apparatus of FIG. 1 taken at line 6-6.
Figure 7:
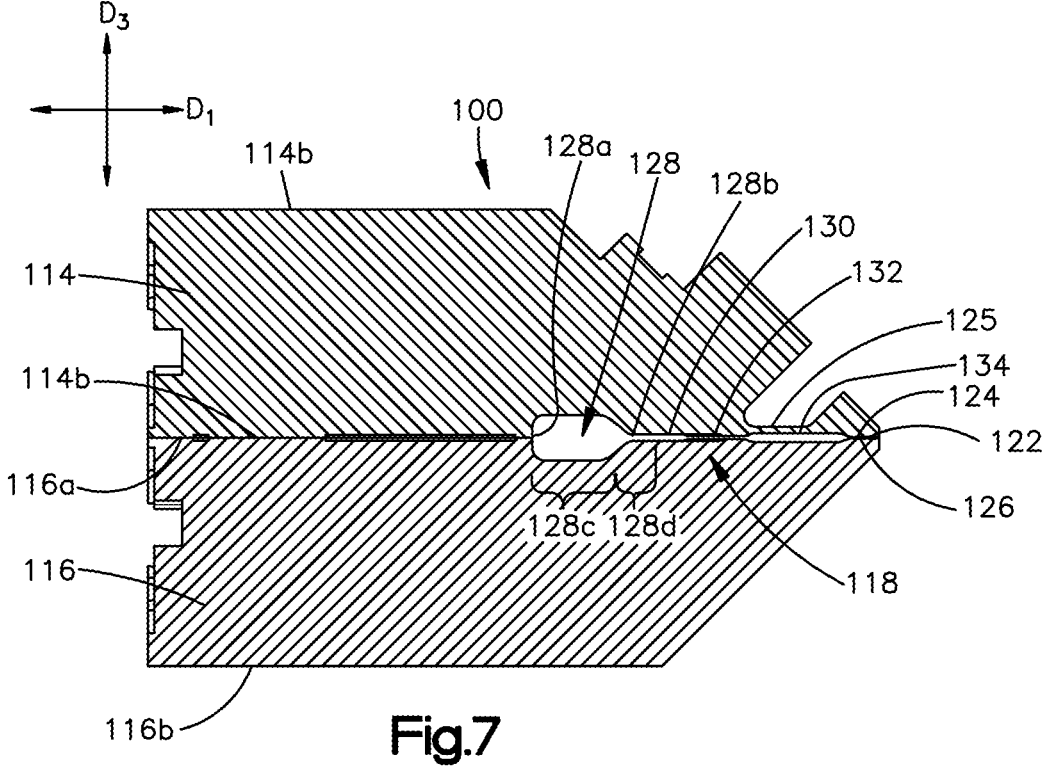
FIG. 7 shows another cross-sectional view of the extrusion die apparatus of FIG. 1 taken at line 7-7.

Turning to the cross-sections of FIGS. 6 and 7, the primary manifold 128 can have a back end 128c and a front end 128d. In some examples, the height or depth $d_9$ of the primary manifold 128 at back end 128c in a cross-sectional plane can be substantially uniform or constant as the back end 128c extends towards the front end 128d. The front end 128d can taper inwardly in the cross-sectional plane as it extends from the back end 128c towards the front line 128b of the primary manifold 128. Thus, the height or depth $d_9$ can decrease as the front end 128d extends from the back end 128c towards the front line 128b.

Figure 8:
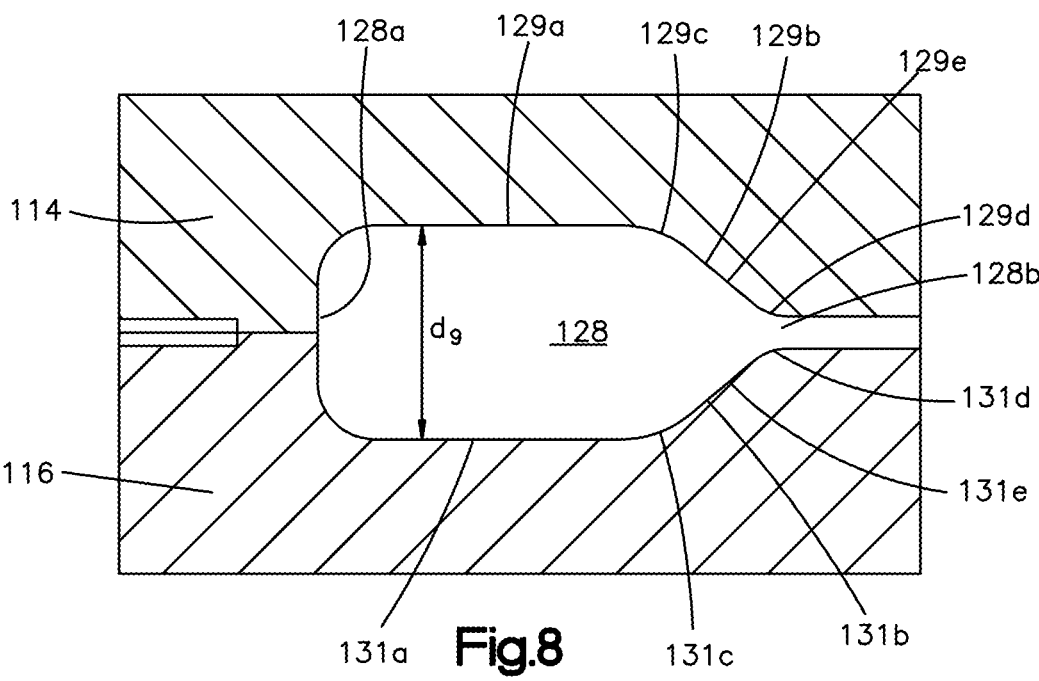
FIG. 8 shows an enlarged cross-sectional view of a primary chamber of the extrusion die apparatus of FIG. 1 according to one example.

Referring more specifically to FIG. 8, an enlarged view of the primary manifold 128 is shown according to one example. The first die body 114 can have back-end inner surface 129a, and a front-end inner surface 129b that extends from the back-end inner surface 129a towards the front line 128b. The back-end inner surface 129a and the front-end inner surface 129b define a first side of the primary manifold 128. Similarly, the second die body 116 can have a back-end inner surface 131a and a front-end inner surface 131b that extends from the back-end inner surface 131a towards the front line 128b. The back-end inner surface 131a and the front-end inner surface 131b define a second side of the primary manifold 128. The inner surfaces 129a and 129b can be opposite the inner surfaces 131a and 131b, respectively, so as to define the primary manifold 128 therebetween. The height or depth $d_9$ of the primary manifold 128 in a cross-sectional plane from the back-end inner surface 129a to the back-end inner surface 131a can be constant along the first direction $D_1$. The front-end inner surfaces 129b and 131b can converge towards one another as they extend from the back-end surfaces 129*a* and 131*a*, respectively, towards the front line 128*b*.

The front-end inner surface 129*b* can have a first curved portion 129*c* that extends from the back-end inner surface 129*a* towards the front line 128*b*. The first curved portion 129*c* can curve concavely inwards (as viewed from inside the primary manifold 128) towards the second body 116 as the first curved portion 129*c* extends towards the front line 128*b*. The first curved portion 129*c* can have a radius of curvature that varies as the first curved portion 129*c* extends outwardly towards the first and second ends 106 and 108 of the extrusion die 100. For example, the radius of curvature of the first curved portion 129*c* can increase as the first curved portion 129*c* extends outwardly towards the first and second ends 106 and 108 of the extrusion die 100. In alternative examples, the radius of curvature can be constant as the first curved portion 131*c* extends outwardly towards the first and second ends 106 and 108 of the extrusion die 100. The radius of curvature can range from $$\frac{\text{depth } d_9}{4} \text{ to (depth } d_9 \times 10).$$

The front-end inner surface 129*b* can have a second curved portion 129*d* that extends from the front line 128*b* towards the back-end inner surface 129*a*. The second curved portion 129*d* can curve convexly outwards (as viewed from inside the primary manifold 128) away from the second body 116 as the second curved portion 129*d* extends towards the back line 128*a*. The second curved portion 129*d* can have a radius of curvature that varies as the second curved portion 129*d* extends outwardly towards the first and second ends 106 and 108 of the extrusion die 100. For example, the radius of curvature of the second curved portion 129*d* can increase as the second curved portion 129*d* extends outwardly towards the first and second ends 106 and 108 of the extrusion die 100. In alternative examples, the radius of curvature can be constant as the second curved portion 129*d* extends outwardly towards the first and second ends 106 and 108 of the extrusion die 100. The radius of curvature can range from $$\frac{\text{depth } d_9}{4} \text{ to (depth } d_9 \times 25).$$

In some examples, the first and second curved portions 129*c* and 129*d* can be tangent to one another. In some examples, the first and second curved portions 129*c* and 129*d* can be adjoined to one another, such that the front-end surface 129*b* is continuously curved from the back-end surface 129*a* to the front line 128*b* without any linear portion extending from the first curved portion 129*c* to the second curved portion 129*d*. In other examples, the front-end inner surface 129*b* can comprise a linear portion 129*e* that extends from the first curved portion 129*c* to the second curved portion 129*d*. In some examples, no more than one third of a length of the front-end surface 129*b* from the back-end surface 129*a* to the front line 128*b* is linear.

Similarly, the front-end inner surface 131*b* can have a first curved portion 131*c* that extends from the back-end inner surface 131*a* towards the front line 128*b*. The first curved portion 131*c* can curve concavely inwards (as viewed from inside the primary manifold 128) towards the first body 114 as the first curved portion 131*c* extends towards the front line 128*b*. The first curved portion 131*c* can have a radius of curvature that varies as the first curved portion 131*c* extends outwardly towards the first and second ends 106 and 108 of the extrusion die 100. For example, the radius of curvature of the first curved portion 131*c* can increase as the first curved portion 131*c* extends outwardly towards the first and second ends 106 and 108 of the extrusion die 100. In alternative examples, the radius of curvature can be constant as the first curved portion 131*c* extends outwardly towards the first and second ends 106 and 108 of the extrusion die 100. The radius of curvature can range from $$\frac{\text{depth } d_9}{4} \text{ to (depth } d_9 \times 10).$$

The front-end inner surface 131*b* can have a second curved portion 131*d* that extends from the front line 128*b* towards the back-end inner surface 129*a*. The second curved portion 131*d* can curve convexly outwards (as viewed from inside the primary manifold 128) away from the first body 114 as the second curved portion 131*d* extends towards the back line 128*a*. The second curved portion 131*d* can have a radius of curvature that varies as the second curved portion 131*d* extends outwardly towards the first and second ends 106 and 108 of the extrusion die 100. For example, the radius of curvature of the second curved portion 131*d* can increase as the second curved portion 131*d* extends outwardly towards the first and second ends 106 and 108 of the extrusion die 100. In alternative examples, the radius of curvature can be constant as the second curved portion 131*d* extends outwardly towards the first and second ends 106 and 108 of the extrusion die 100. The radius of curvature can range from $$\frac{\text{depth } d_9}{4} \text{ to (depth } d_9 \times 25).$$

In some examples, the first and second curved portions 131*c* and 131*d* can be tangent to one another. In some examples, the first and second curved portions 131*c* and 131*d* can be adjoined to one another, such that the front-end surface 131*b* is continuously curved from the back-end surface 129*a* to the front line 128*b* without any linear portion extending from the first curved portion 131*c* to the second curved portion 131*d*. In other examples, the front-end inner surface 131*b* can comprise a linear portion 131*e* that extends from the first curved portion 131*c* to the second curved portion 131*d*. In some examples, no more than one third of a length of the front-end surface 131*b* from the back-end surface 131*a* to the front line 128*b* is linear.

Although the example of FIG. 8 is discussed as having four curved portions 129*c*, 129*d*, 131*c*, and 131*d*, examples of the disclose are not so limited. In alternative examples, the primary manifold 128 can have as few as one of the curved portions, up to all four of the curved portions.

Figure 9:
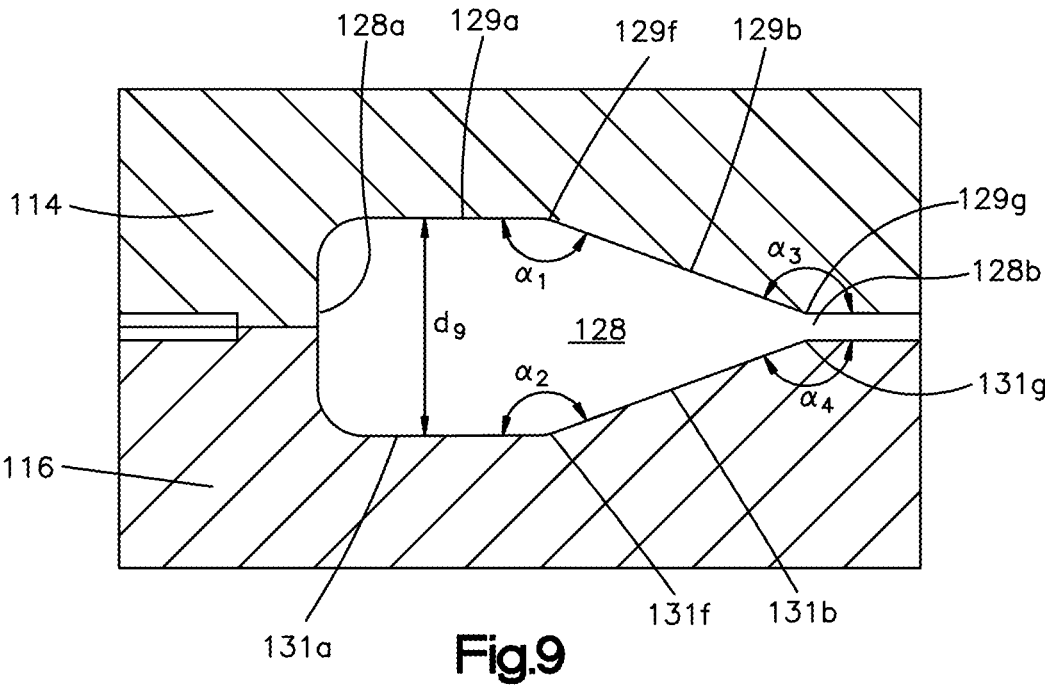
FIG. 9 shows an enlarged cross-sectional view of a primary chamber of the extrusion die apparatus of FIG. 1 according to another example.

Referring briefly to FIG. 9, an enlarged view of the primary manifold 128 is shown according to another example. In this example and similar to the example of FIG. 8, the first die body 114 can have back-end inner surface 129*a* and a front-end inner surface 129*b*, and the second die body 116 can have a back-end inner surface 131*a* and a front-end inner surface 131*b*. The back-end inner surfaces 129*a* and 131*a* can be configured as discussed above. However, unlike the primary manifold 128 of FIG. 8 in which the front-end surfaces 129b and 131b are curved, the primary manifold 128 of FIG. 9 has front-end surfaces 129b and 131b that are angled. In particular, the front-end inner surfaces 129b and 131b are linear as they extend from the back-end inner surfaces 129a and 131a, respectively, to the front line 128b of the primary manifold 128. The front-end inner surfaces 129b and 131b can converge towards one another as they extend from the back-end inner surfaces 129a and 131a, respectively, towards the front line 128b. The front-end inner surfaces 129b and 131b can terminate at the back-end inner surfaces 129a and 131a, respectively, at lines 129f and 131f, respectively. Further, the front-end inner surfaces 129b and 131b can terminate at the front line 128b at lines 129g and 131g, respectively.

The line 129f can define a vertex between the back-end inner surface 129a and the front-end inner surface 129b. An angle $\alpha_1$ can be defined between the back-end inner surface 129a and the front-end inner surface 129b. The angle $\alpha_1$ can vary as the back-end inner surface 129a and the front-end inner surface 129b extend outwardly towards the first and second ends 106 and 108 of the extrusion die 100. For example, the angle $\alpha_1$ can increase as the back-end inner surface 129a and the front-end inner surface 129b extend outwardly towards the first and second ends 106 and 108 of the extrusion die 100. Alternately, the angle $\alpha_1$ can be constant as the back-end inner surface 129a and the front-end inner surface 129b extend outwardly towards the first and second ends 106 and 108 of the extrusion die 100.

The line 131f can define a vertex between the back-end inner surface 131a and the front-end inner surface 131b. An angle $\alpha_2$ can be defined between the back-end inner surface 131a and the front-end inner surface 131b. The angle $\alpha_2$ can vary as the back-end inner surface 131a and the front-end inner surface 131b extend outwardly towards the first and second ends 106 and 108 of the extrusion die 100. For example, the angle $\alpha_2$ can increase as the back-end inner surface 131a and the front-end inner surface 131b extend outwardly towards the first and second ends 106 and 108 of the extrusion die 100. Alternately, the angle $\alpha_2$ can be constant as the back-end inner surface 131a and the front-end inner surface 131b extend outwardly towards the first and second ends 106 and 108 of the extrusion die 100.

The line 129g can define a vertex at the end of the front-end surface 129b, opposite the line 129f, such as between the front-end inner surface 129b and a surface that defines the next chamber. An angle $\alpha_3$ can be defined between the front-end inner surface 129b and the surface that defines the next chamber. The angle $\alpha_3$ can vary as the front-end inner surface 129b extends outwardly towards the first and second ends 106 and 108 of the extrusion die 100. For example, the angle $\alpha_3$ can increase as the front-end inner surface 129b extends outwardly towards the first and second ends 106 and 108 of the extrusion die 100. Alternately, the angle $\alpha_3$ can be constant as the front-end inner surface 129b extends outwardly towards the first and second ends 106 and 108 of the extrusion die 100.

The line 131g can define a vertex at the end of the front-end surface 131b, opposite the line 131f, such as between the front-end inner surface 131b and a surface that defines the next chamber. An angle $\alpha_4$ can be defined between the front-end inner surface 131b and the surface that defines the next chamber. The angle $\alpha_4$ can vary as the front-end inner surface 131b extends outwardly towards the first and second ends 106 and 108 of the extrusion die 100. For example, the angle $\alpha_4$ can increase as the front-end inner surface 131b extends outwardly towards the first and second ends 106 and 108 of the extrusion die 100. Alternately, the angle $\alpha_4$ can be constant as the front-end inner surface 131b extends outwardly towards the first and second ends 106 and 108 of the extrusion die 100.

Compared to the primary manifold 128 in the example of FIG. 9 in which the front-end surfaces 129b and 131b are angled, the primary manifold 128 in FIG. 8 having the curved front-end surfaces 129b and 131b can result in less shear variation of the fluid when the fluid is flowing through the primary manifold 128. This in turn can result in a more uniform flow orientation of the fluid in its further trajectory in and even outside the extrusion die 100. Implementing the curved portions 129c, 129d, 131c, and 131d can result in more flexibility in designing the manifold shape and may enable the fluid to be spread more equally across the width of the extrusion die 100 and with less shear introduced into the fluid. It will be understood that virtually any primary manifold design, either previously discovered or not yet discovered, can be implemented with curved front-end surfaces in a manner similar to that of the examples of FIG. 8. This can be done without any restriction towards the shape of the manifold or also of the preland (discussed further below). Further, the curved front-end surfaces can be applied to coat-hanger-shaped manifolds, T-shaped manifolds, manifolds with straight backline, manifolds with an inverted preland, or any other suitable manifold shape.

Referring back to FIGS. 3 to 5, the plurality of chambers of the extrusion cavity 118 of the extrusion die 100 can optionally comprise an intermediate chamber 130 that extends from the primary manifold 128 towards the outlet 122 along the first direction $D_1$. The intermediate chamber 130 can be in fluid communication with the primary manifold 128 and the inlet 120. The intermediate chamber 130 can have a back line 130a and a front line 130b that are offset from one another along the first direction $D_1$. The back line 130a can be coextensive with the front line 128b of the primary manifold 128. The back line 130a can taper away from the front line 130b as the back line 130a extends outwards towards the first and second ends 106 and 108 of the extrusion die 100. Similarly, the front line 130b can taper away from the back line 130a as the front line 130b extends outwards towards the first and second ends 106 and 108 of the extrusion die 100. As a result, the intermediate chamber 130 can have a cross-sectional shape of a bowtie in a plane that is perpendicular to the third direction $D_3$. The intermediate chamber 130 can have a dimension $d_{10}$, such as a length, along the first direction from the back line 130a to the front line 130b, where the length $d_{10}$ increases as the intermediate chamber 130 extends towards the first and second ends 106 and 108. Thus, the length $d_{10}$ can be larger towards the first and second ends 106 and 108 than it is towards a center of the primary manifold 128.

Turning to the cross-sections of FIGS. 6 and 7, the intermediate chamber 130 can also have a gap that has a dimension $d_{11}$ along the third direction $D_3$. The dimension $d_{11}$ can be constant as the intermediate chamber 130 extends towards the first and second ends 106 and 108. The dimension $d_{11}$ can be less than the height or depth $d_9$ of the primary manifold 128. The dimension $d_{11}$ can be constant as the intermediate chamber 130 extends along the first direction $D_1$ between the back line 130a and the front line 130b. Note, however, that the intermediate chamber 130 can have a front end portion that tapers inwardly as the intermediate chamber 130 extends along the first direction to the front line 130b such that the dimension $d_{11}$ decreases to a dimension of the preland 132.

In conventional extrusion dies having a primary manifold with a linear back line, the primary manifold channel can be too large in volume towards the ends of the extrusion die. This can result in long polymer residence times. In FIGS. 3 to 5, the intermediate chamber 130 can reduce the volume of the primary manifold 128 towards each end 106 and 108 of the extrusion die 100. Since the front line 128$b$ of the primary manifold 128 tapers upstream towards each end 106 and 108 of the extrusion die 100, the length $d_8$ of the primary manifold 128 towards the first and second ends 106 and 108 can be smaller than that of a comparable conventional extrusion die 100 that has a primary manifold with a linear back line. Further, the height or depth $d_9$ of the primary manifold 128 can also taper as the primary manifold 128 extends towards each end 106 and 108. This can further reduce the volume at the first and second ends 106 and 108 compared to a comparable conventional extrusion die 100. The intermediate chamber 130 can promote more uniform distribution of the fluid across the width of the extrusion die 100 along the second direction $D_2$.

Figure 10:
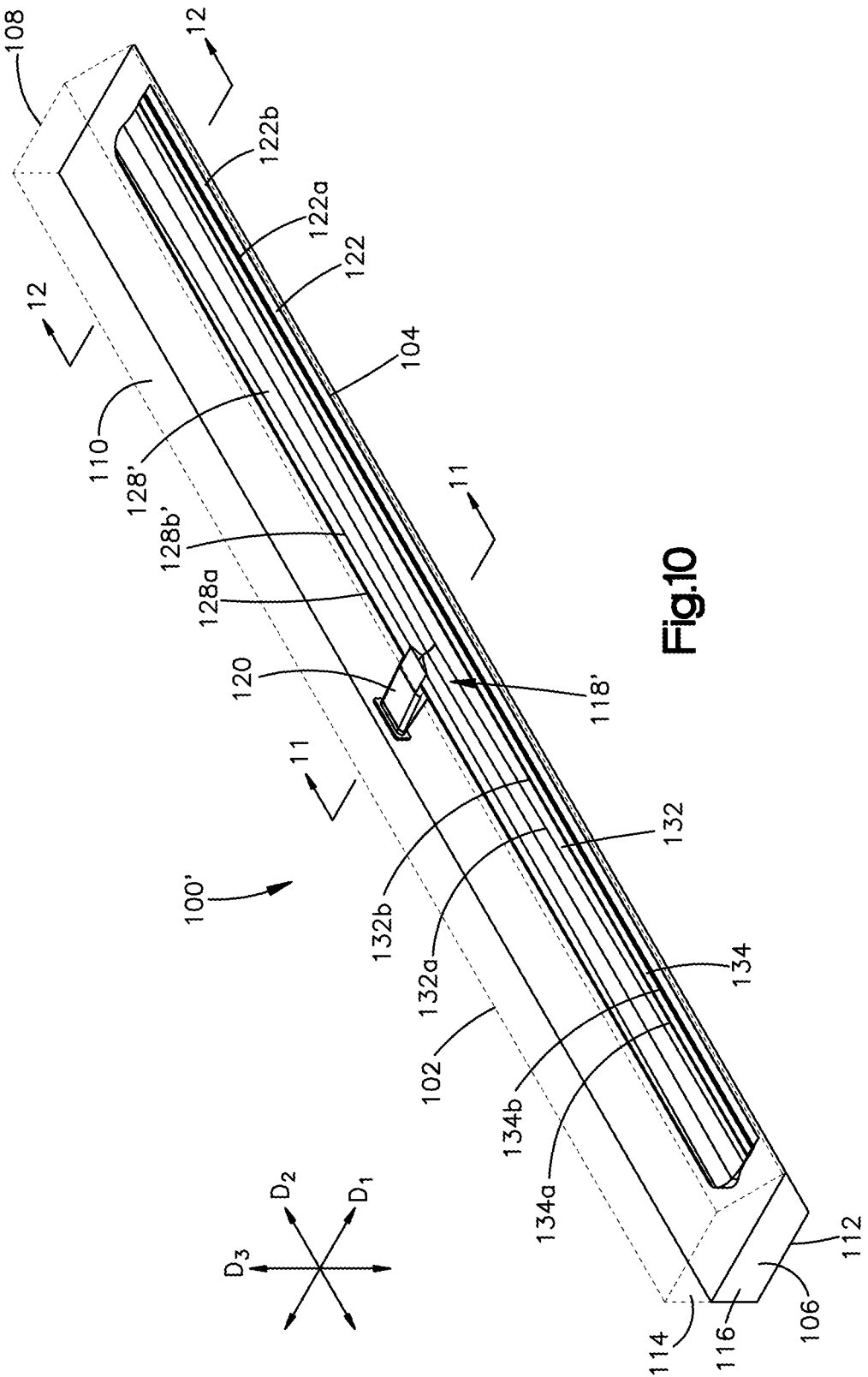
FIG. 10 shows a perspective view of an outlet side of an extrusion die apparatus according to another example, with a first body of the apparatus shown in phantom lines so that an interior cavity of the apparatus is visible.
Figures 13, 14:
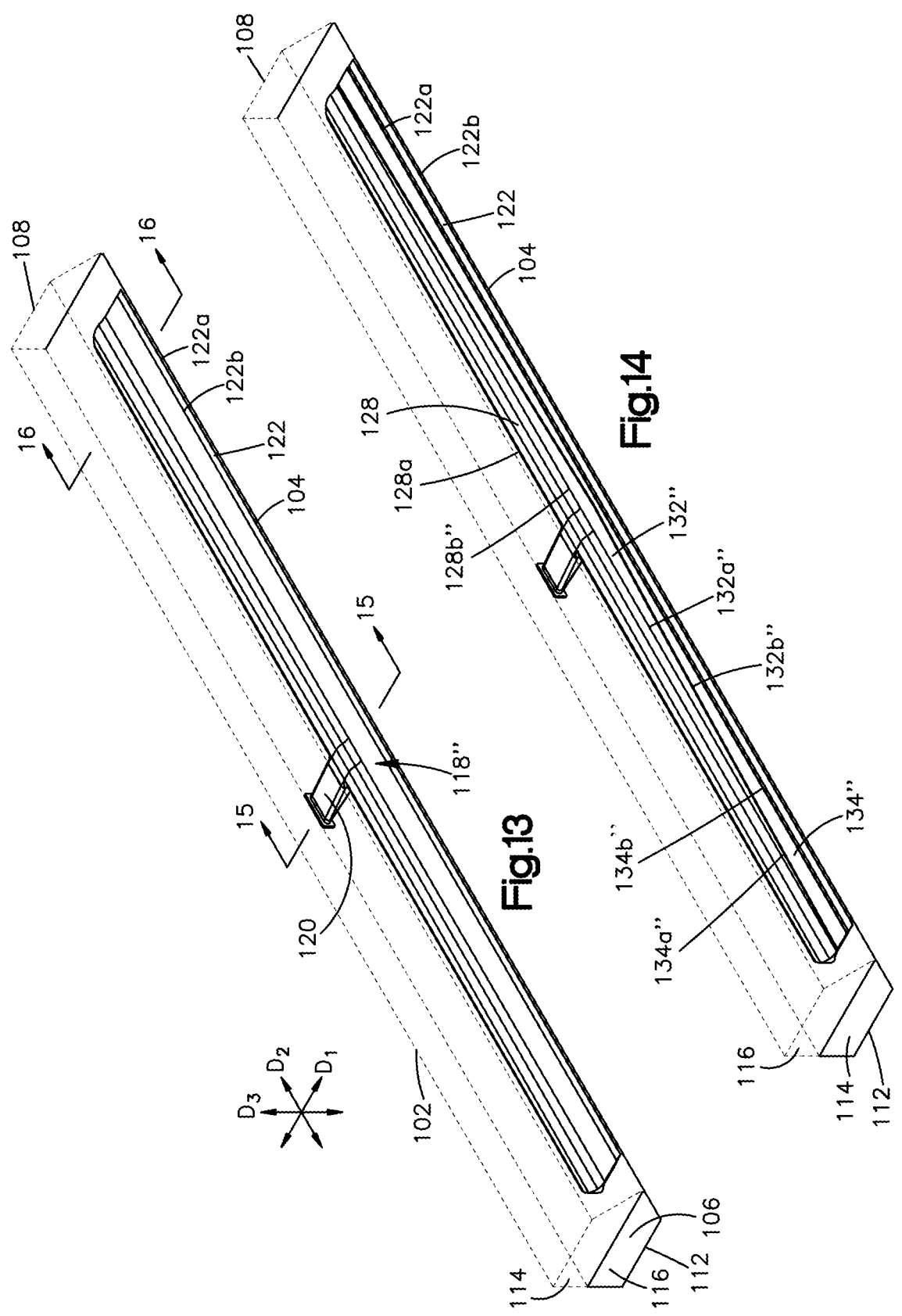
FIG. 13 shows a perspective top view of an outlet side of an extrusion die apparatus according to another example, with a first body of the apparatus shown in phantom lines so that an interior cavity of the apparatus is visible.
FIG. 14 shows a perspective bottom view of an outlet side of the extrusion die apparatus of FIG. 13, with a second body of the apparatus shown in phantom lines so that the interior cavity of the apparatus is visible.

Referring back to FIGS. 3 to 5, the plurality of chambers of the extrusion cavity 118 of the extrusion die 100 can comprise a preland 132 that extends from the intermediate chamber 130 towards the outlet 122 along the first direction $D_1$. The preland 132 is in fluid communication with the intermediate chamber 130, and consequently the primary manifold 128 and the inlet 120. Note that, in alternative examples that do not implement the intermediate chamber 130, the preland 132 can extend from the primary manifold 128 towards the outlet 122 along the first direction $D_1$ as shown in FIGS. 10 and 14, and the preland 132 can be in fluid communication with the primary manifold 128.

The preland 132 can have a back line 132$a$ and a front line 132$b$ that are offset from one another along the first direction $D_1$. The back line 132$a$ can be coextensive with the front line 130$b$ of the intermediate chamber 130 or the front line 128$b$ of the primary manifold 128 (in examples where the intermediate chamber 130 is not implemented). The back line 132$a$ can taper towards the front line 132$b$ as the back line 132$a$ extends outwards towards the first and second ends 106 and 108 of the extrusion die 100. At least a portion, up to an entirety, of the front line 132$b$ can be linear along the second direction $D_2$ as the front line 132$b$ extends outwards towards the first and second ends 106 and 108 of the extrusion die 100. The front line 132$b$ can be substantially parallel to the outlet 122. Thus, the preland 132 can have a substantially triangular cross-sectional shape in a plane that is perpendicular to the third direction $D_3$. The preland 132 can have a dimension $d_{12}$, such as a length, along the first direction from the back line 132$a$ to the front line 132$b$, where the length $d_{12}$ decreases as the intermediate chamber 130 extends towards the first and second ends 106 and 108. Thus, the length $d_{10}$ can be smaller towards the first and second ends 106 and 108 than it is towards a center of the preland 132.

Commonly, there is a pressure drop from a center of the primary manifold 128 as the fluid fans out towards the first and second ends 106 and 108. The preland 132 is configured to be longer towards the center of the extrusion die 100 so as to decrease a pressure near the center and thereby make the pressure across the width of the extrusion die 100 more uniform. The preland 132 should preferably configured such that, the speed, pressure, and sheer of the fluid material at the end of the preland 132 are each uniform across a width of the extrusion die 100 along the second direction $D_2$.

Turning to the cross-sections of FIGS. 6 and 7, the preland 132 can define a preland gap having a dimension $d_{13}$, such as a height or depth, along the third direction $D_3$. The height or depth $d_{13}$ can be constant as the preland 132 extends towards the first and second ends 106 and 108. Alternatively, the height or depth $d_{13}$ can increase as the preland 132 extends towards the first and second ends 106 and 108. The height or depth $d_{13}$ can be less than the dimension $d_{11}$ of the intermediate chamber 130 and the height or depth $d_9$ of the primary manifold 128. The height or depth $d_{13}$ can be constant as the preland 132 extends along the first direction $D_1$ between the back line 132$a$ and the front line 132$b$. Note, however, that the preland 132 can taper outwardly at a front end of the preland 132 to the front line 132$b$ to adjoin to the secondary manifold 134.

Referring back to FIGS. 3 to 5, the plurality of chambers of the extrusion cavity 118 of the extrusion die 100 can comprise a secondary manifold 134, which may also be referred to as a melt well, that extends from the preland 132 towards the outlet 122 along the first direction $D_1$. The secondary manifold 134 can be in fluid communication with the preland 132, and consequently, the intermediate chamber 130, the primary manifold 128, and the inlet 120. The secondary manifold 134 can have a back line 134$a$ and a front line 134$b$ that are offset from one another along the first direction $D_1$. The back line 134$a$ can be coextensive with the front line 132$b$ of the preland 132.

At least a portion, up to an entirety, of the back line 134$a$ can be linear along the second direction $D_2$ as the back line 134$a$ extends outwards towards the first and second ends 106 and 108 of the extrusion die 100. The back line 134$a$ can be substantially parallel to the outlet 122. Similarly, at least a portion, up to an entirety, of the front line 134$b$ can be linear along the second direction $D_2$ as the front line 134$b$ extends outwards towards the first and second ends 106 and 108 of the extrusion die 100. The front line 134$b$ can be substantially parallel to the outlet 122. Thus, the secondary manifold 134 can have a rectangular cross-sectional shape in a plane that is perpendicular to the third direction $D_3$. The secondary manifold 134 can have a dimension $d_{14}$, such as a length, along the first direction from the back line 134$a$ to the front line 134$b$, where the length $d_{14}$ is constant as the secondary manifold 134 extends towards the first and second ends 106 and 108. Thus, the length $d_{14}$ can be the same at the center of the secondary manifold 134 and at the first and second ends 106 and 108. When the intermediate chamber 130 is implemented, the preland 132 can be implemented as shown such that a tip of the triangular shape points towards inlet, and the front line 132$b$ of the preland 132 can be substantially parallel to the outlet 122. This allows secondary manifold 134 to have the rectangular shape, which promotes more linear fluid flow across the width of the secondary manifold 134 and in the first direction $D_1$ towards the outlet 122. This is in contrast to a conventional extrusion die that has an inverted preland (i.e., the tip of the triangular shape points towards the outlet). In such a conventional die, the inverted preland results in the secondary manifold varying in dimension from the center of the die to the ends of the die. This can, in turn, result in lateral fluid flow (i.e., along the second direction $D_2$) within the secondary manifold at a time when lateral fluid flow is not desired.

Turning to the cross-sections of FIGS. 6 and 7, the secondary manifold 134 can have a dimension $d_{15}$, such as a height or depth, along the third direction $D_3$. The height or depth $d_{15}$ can be constant as the secondary manifold 134 extends towards the first and second ends 106 and 108. The height or depth $d_{15}$ can be greater than the height or depth (113 of the preland 132. In some examples, the height or depth $d_{15}$ can be greater than the dimension $d_{11}$ of the intermediate chamber 130. The height or depth $d_{15}$ can be constant as the secondary manifold 134 extends along the first direction $D_1$ between the back line 134$a$ towards the front line 134$b$. Note, however, that the secondary manifold 134 can taper inwardly at a front end of the secondary manifold 134 to the front line 134$b$ to adjoin to the outlet 122. The secondary manifold 134 is configured to have a height or depth that is greater than the preland 132 so that the secondary manifold 134 acts to slow down a velocity of the fluid. Slowing down the velocity in turn reduces the pressure of the fluid on the first and second lips 124 and 126 that could otherwise cause the lips 124 and 126 to deflect away from one another.

Referring back to FIGS. 3 to 5, the plurality of chambers of the extrusion cavity 118 of the extrusion die 100 can comprise the outlet 122, which extends from the secondary manifold 134 away from the inlet 120 along the first direction $D_1$. The outlet 122 can be in fluid communication with the secondary manifold 134, and consequently, the preland 132, the intermediate chamber 130, the primary manifold 128, and the inlet 120. The outlet 122 can have a back line 122$a$ and a front line 122$b$ that are offset from one another along the first direction $D_1$. The back line 122$a$ can be coextensive with the front line 132$b$ of the secondary manifold 134. At least a portion, up to an entirety, of the back line 122$a$ can be linear along the second direction $D_2$ as the back line 122$a$ extends outwards towards the first and second ends 106 and 108 of the extrusion die 100. Similarly, at least a portion, up to an entirety, of the front line 122$b$ can be linear along the second direction $D_2$ as the front line 122$b$ extends outwards towards the first and second ends 106 and 108 of the extrusion die 100. As a result, the outlet 122 can have a rectangular cross-sectional shape in a plane that is perpendicular to the third direction $D_3$. The outlet 122 can have a dimension (116, such as a length, along the first direction from the back line 122$a$ to the front line 122$b$, where the length (116 is constant as the outlet 122 extends towards the first and second ends 106 and 108. Thus, the length (116 can be the same at the center of the outlet 122 and at the first and second ends 106 and 108.

Turning to the cross-sections of FIGS. 6 and 7, the outlet 122 can define a gap having a dimension $d_5$ along the third direction $D_3$. The dimension $d_5$ can be less than the dimension (115 of the secondary manifold 134. In some examples, the dimension $d_5$ can be less than the height or depth (113 of the preland 132. The outlet 122 can be defined by a lip 124 of the first die body 114 and a lip 126 of the second die body 116. In some examples, the first die body 114 can comprise a hinge 125 that is configured to flex so as to move at least a portion of the lip 124 along the third direction $D_3$ towards or away from the lip 126 to fine tune the dimension $d_5$. Although not shown, a plurality of adjusters can be spaced from one another along the second direction $D_2$, where each adjuster is configured to engage the lip 124 so as to move a different portion of the lip 126 along the third direction $D_3$. The lip 124 can be configured to be adjusted by the adjusters so as to vary the dimension $d_5$ along the second direction $D_2$ so as to obtain a desired profile of the extruded sheet. Thus, the lip 124 can be considered to be a flexible lip. The lip 126, on the other hand, can be a fixed lip that does not move relative to a remainder of the second die body 116.

Figure 11:
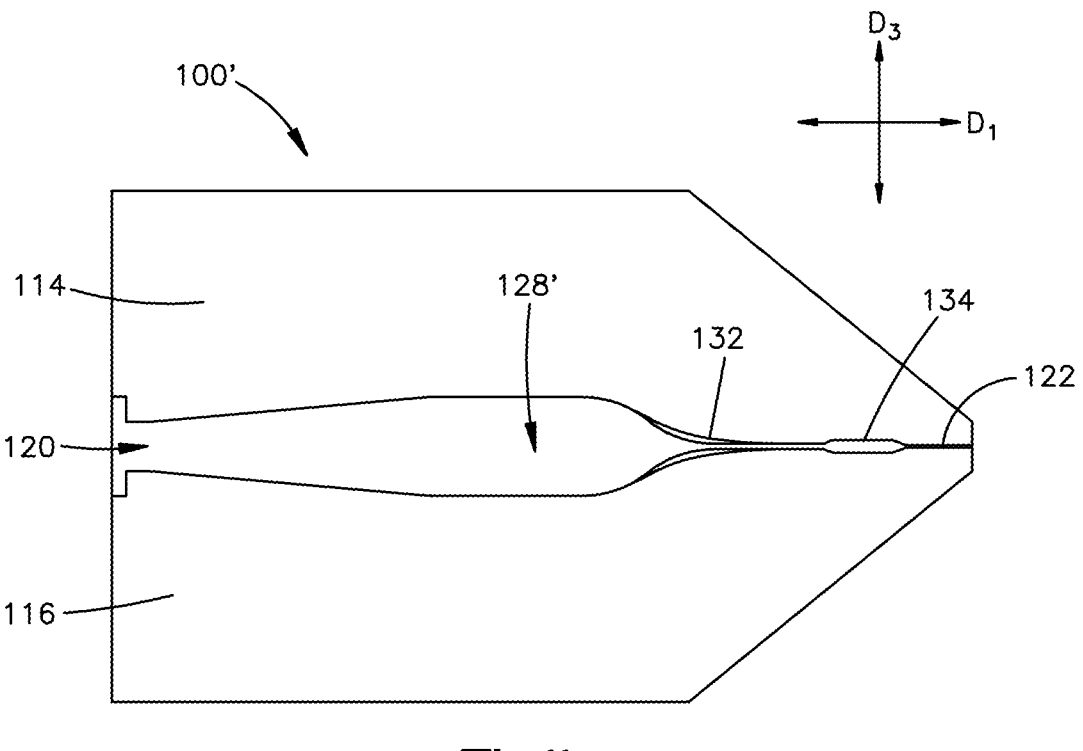
FIG. 11 shows a cross-sectional view of the extrusion die apparatus of FIG. 10 taken at line 11-11.
Figure 12:
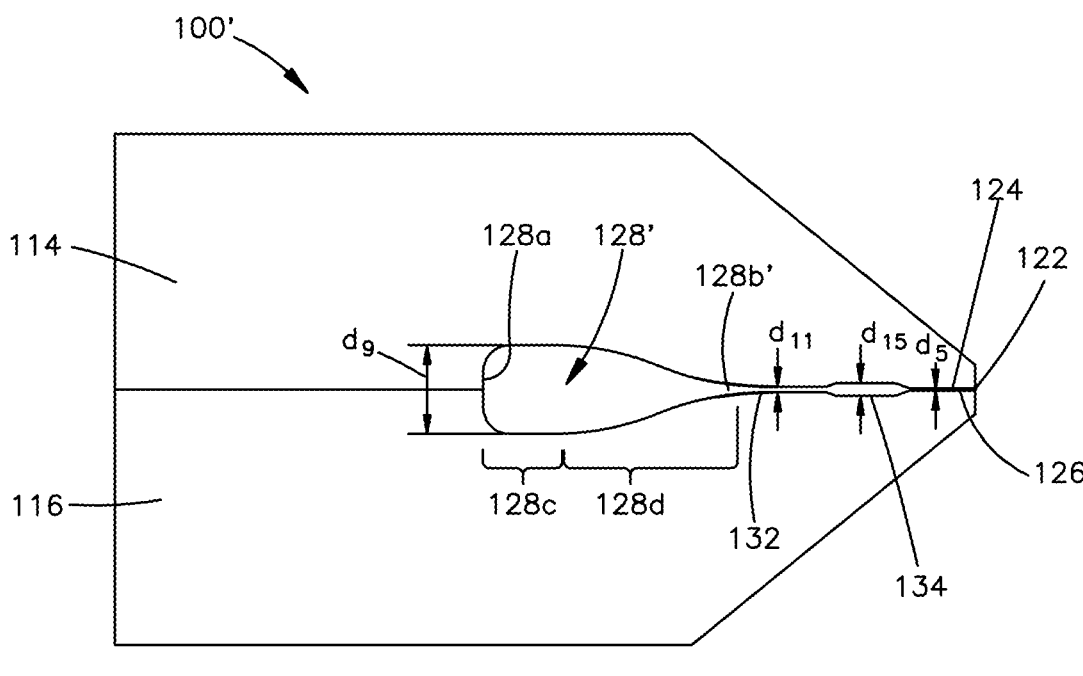
FIG. 12 shows another cross-sectional view of the extrusion die apparatus of FIG. 10 taken at line 12-12.

Turning to FIGS. 10 to 12, an extrusion die 100' is shown according to another example. The extrusion die 100' has a plurality of features that are similar to those discussed above in relation to extrusion die 100 of FIGS. 1 to 9. Accordingly, like features are labeled with like reference numerals, and the descriptions to those features above apply equally to the corresponding features of FIGS. 10 to 12. In this example, the extrusion die 100' defines an extrusion cavity 118 that comprises an inlet 120, a primary manifold 128', a preland 132, a secondary manifold 134, and an outlet 122. The inlet 120, the preland 132, the secondary manifold 134, and the outlet 122 may be configured as discussed above in relation to extrusion die 100 of FIGS. 1 to 9. However, the extrusion die 100' is devoid of the intermediate chamber 130 of FIGS. 1 to 9, resulting in the primary manifold 128' of FIGS. 10 to 12 having a front line 128$b$' having a slightly different configuration from the primary manifold 128 of FIGS. 1 to 9.

In particular, the front line 128$b$' can taper away from the back line 128$a$ as the front line 128$b$' extends outwards towards the first and second ends 106 and 108 of the extrusion die 100. In some examples, the front line 128$b$' can be linear as it extends towards the first end 106 and linear as it extends towards the second end 108. In other examples (not shown), the front line 128$b$' can be curved towards the back line 128$a$ as it extends towards the first end 106 so as to form an arc of a first circle, and curved towards the back line 128$a$ as it extends towards the second end 108 so as to form an arc of a second circle. The primary manifold 128 can have a dimension $d_8$, such as a length, along the first direction from the back line 128$a$ to the front line 128$b$', where the length $d_8$ increases as the primary manifold 128' extends towards the first and second ends 106 and 108. Thus, the length $d_8$ can be larger towards the first and second ends 106 and 108 than it is towards a center of the primary manifold 128'. Aside from the different configuration of the front line 128$b$', the primary manifold 128' can have a back end 128$c$ and a front end 128$d$ that may be configured as discussed above, and can have cross-sections that are similar to those discussed above in relation to FIG. 8 or FIG. 9.

Turning now to FIGS. 13 to 16, an extrusion die 100" is shown according to yet another example. The extrusion die 100" has a plurality of features that are similar to those discussed above in relation to extrusion die 100 of FIGS. 1 to 9. Accordingly, like features are labeled with like reference numerals, and the descriptions to those features above apply equally to the corresponding features of FIGS. 13 to 16. In this example, the extrusion die 100" defines an extrusion cavity 118 that comprises an inlet 120, a primary manifold 128", a preland 132", a secondary manifold 134", and an outlet 122. The inlet 120 and the outlet 122 may be configured as discussed above in relation to extrusion die 100 of FIGS. 1 to 9. However, the extrusion die 100" is devoid of the intermediate chamber 130 of FIGS. 1 to 9, and the primary manifold 128", the preland 132", and the secondary manifold 134" have different configurations from the primary manifold 128, the preland 132, and the secondary manifold 134, respectively, of FIGS. 1 to 9. Further, the first and second recesses defined in the first and second die bodies 114 and 116, respectively, which together define the extrusion cavity 118, differ from one another and are thus not mirror images of one another.

The primary manifold 128" can comprise a linear back line 128$a$ similar to that discussed above in relation to FIGS. 1 to 9. However, the front line 128$b$" of the primary manifold 128" can also be linear along the second direction $D_2$ as the front line 128$b$" extends outwards towards the first and second ends 106 and 108 of the extrusion die 100". Thus, the front line 128$b$" can be substantially parallel to the outlet 122. The primary manifold 128" can have a dimension $d_8$, such as a length, along the first direction from the back line 128$a$ to the front line 128$b$", where the length $d_8$ is constant as the primary manifold 128" extends towards the first and second ends 106 and 108. The primary manifold 128" can have cross-sections that are similar to those discussed above in relation to FIG. 8 or FIG. 9.

The preland 132" can have a back line 132a" that is linear along the second direction $D_2$ as the back line 132a" extends outwards towards the first and second ends 106 and 108 of the extrusion die 100". Thus, the back line 132a" can be substantially parallel to the outlet 122. The front line 132b" of the preland 132" can taper towards the back line 132a" as the front line 132b" extends outwards towards the first and second ends 106 and 108 of the extrusion die 100". The preland 132" can have a dimension $d_{12}$, such as a length, along the first direction from the back line 132a" to the front line 132b", where the length $d_{12}$ decreases as the preland 132" extends towards the first and second ends 106 and 108. Thus, the length $d_{12}$ can be larger towards a center of the preland 132" than it is towards the first and second ends 106 and 108.

The secondary manifold 134" can have a back line 134a" that tapers away from the front line 134b" as the back line 134a" extends outwards towards the first and second ends 106 and 108 of the extrusion die 100". The front line 134b" can be linear along the second direction $D_2$ as the front line 134b" extends outwards towards the first and second ends 106 and 108 of the extrusion die 100". Thus, the front line 134b" can be substantially parallel to the outlet 122. The secondary manifold 134" can have a dimension $d_{14}$, such as a length, along the first direction from the back line 134a" to the front line 134b", where the length $d_{14}$ increases as the secondary manifold 134" extends towards the first and second ends 106 and 108. Thus, the length $d_{14}$ can be larger towards the first and second ends 106 and 108 than it is at a center of the secondary manifold 134".

Figures 15, 16:
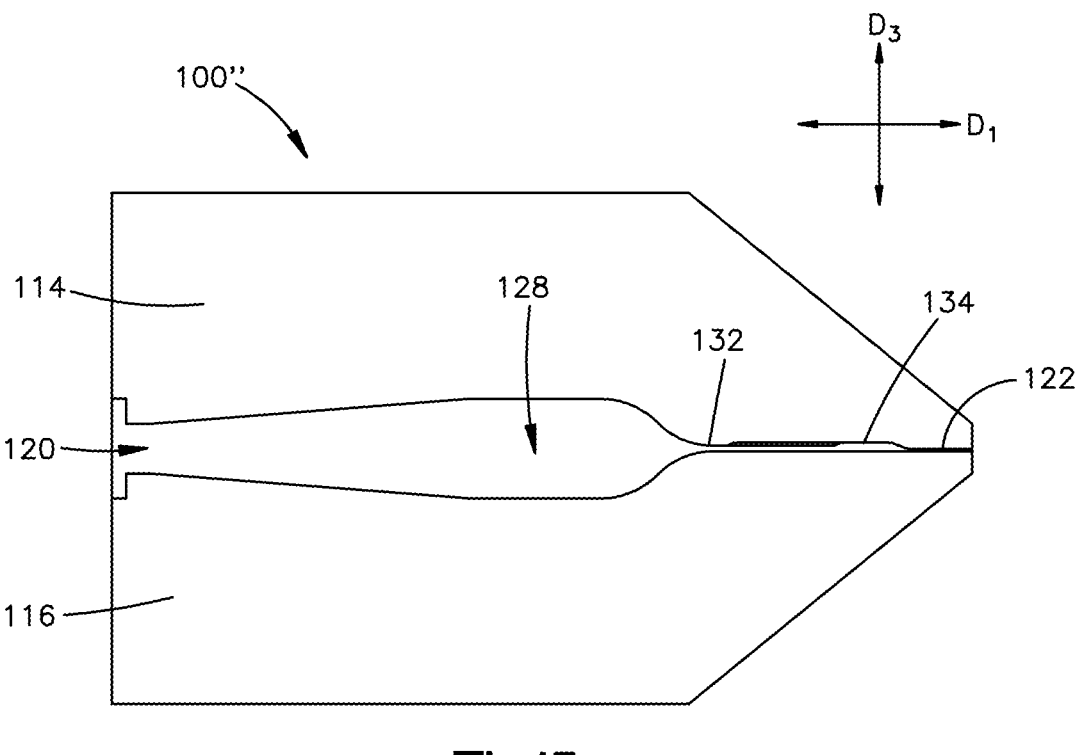
FIG. 15 shows a cross-sectional view of the extrusion die apparatus of FIG. 13 taken at line 15-15.
FIG. 16 shows another cross-sectional view of the extrusion die apparatus of FIG. 13 taken at line 16-16.

As shown in FIGS. 15 and 16, the extrusion cavity 118 can have a first side defined by the first die body 114 and a second side, opposite the first side along the third direction $D_3$, that is defined by the second die body 116. The first side can be substantially planar across the preland 132", the secondary manifold 134", and the outlet 122, while a depth of the second side of the can vary across the preland 132", the secondary manifold 134", and the outlet 122.

The following are a number of nonlimiting EXAMPLES of aspects of the disclosure. One EXAMPLE includes: EXAMPLE 1. An extrusion die includes a first die body and a second die body that define an extrusion cavity therebetween, the extrusion cavity having: an inlet; a primary manifold that extends from the inlet along a flow direction, the primary manifold having a back line, and a front line that is spaced from the back line along the flow direction, the back line being substantially linear along a second direction, perpendicular to the flow direction, as the back line extends outwards towards first and second ends of the extrusion die that are spaced from one another along the second direction, and the front line being tapered towards the back line as the front line extends outwards towards the first and second ends; an intermediate chamber that extends from the primary manifold along the flow direction, the intermediate chamber having a back line that is coextensive with the front line of the primary manifold, and a front line that is spaced from the back line of the intermediate chamber along the flow direction, the front line of the intermediate chamber being tapered away from the back line of the intermediate chamber as the front line of the intermediate chamber extends outwards towards the first and second ends, and the intermediate chamber having a depth along a third direction, perpendicular to the flow direction and the second direction, that is less than a depth of the primary manifold; and an outlet in fluid communication with the primary manifold and the intermediate chamber, the outlet defining a slot that is elongate along the second direction.

The above-noted EXAMPLE may further include any one or a combination of more than one of the following EXAMPLES: 2. The extrusion die of any EXAMPLE herein, where the intermediate chamber has a cross-sectional shape of a bowtie in a plane that is perpendicular to the third direction. 3. The extrusion die of any of any EXAMPLE herein, where the extrusion cavity includes a preland that has a preland back line, and a preland front line that is offset from the preland back line along the flow direction, the preland back line being coextensive with the front line of the intermediate chamber, and the preland back line tapering towards the preland front line as the preland back line extends outwards towards the first and second ends of the extrusion die, the preland having a depth along the third direction that is less than the depth of the intermediate chamber. 4. The extrusion die of any EXAMPLE herein, where the preland front line is linear along the second direction as the preland front line extends outwards towards the first and second ends of the extrusion die 100. 5. The extrusion die of any EXAMPLE herein, the extrusion cavity includes a secondary manifold that has a back line, and a front line that is offset from the back line of the secondary manifold along the flow direction, the back line of the secondary manifold being coextensive with the front line of the preland, and the front and back lines of the secondary manifold each being linear along the second direction as they extend outwards towards the first and second ends of the extrusion die, the secondary manifold having a depth along the third direction that is greater than the depth of the preland. 6. The extrusion die of any of any EXAMPLE herein, where the primary manifold has a back end portion, and a front end portion that extends from the back end portion along the flow direction, the front end portion being defined by opposing front-end inner surfaces of the first and second die body, respectively, at least one of the opposing front-end inner surfaces tapering towards the other of the front-end inner surfaces as it extends along the flow direction, the at least one of the opposing front-end inner surfaces having a first curved portion that extends from the back end portion towards a front line of the primary manifold, and a second curved portion that extends from the front line of the primary manifold towards the back end portion. 7. The extrusion die of any EXAMPLE herein, where the first curved portion is curved concavely inwards towards the extrusion cavity as the first curved portion extends towards the front line. 8. The extrusion die of any of any EXAMPLE herein, where the first curved portion has a radius of curvature that varies as the first curved portion extends outwardly towards the first and second ends of the extrusion die. 9. The extrusion die of any EXAMPLE herein, where the radius of curvature of the first curved portion increases as the first curved portion extends outwardly towards the first and second ends of the extrusion die. 10. The extrusion die of any of any EXAMPLE herein, where the second curved portion curves convexly outwards away from the extrusion cavity as the second curved portion extends towards the back end portion of the primary manifold. 11. The extrusion die of any EXAMPLE herein, where the second curved portion can have a radius of curvature that varies as the second curved portion extends outwardly towards the first and second ends of the extrusion die. 12. The extrusion die of any EXAMPLE herein, where the radius of curvature of the second curved portion increases as the second curved portion extends outwardly towards the first and second ends of the extrusion die. 13. The extrusion die of any of any EXAMPLE herein, where the first and second curved portions are tangent to one another. 14. The extrusion die of any of any EXAMPLE herein, where the first and second curved portions are adjoined to one another such that the front-end inner surface is continuously curved from the back end portion to the front line of the primary manifold without any linear portion extending from the first curved portion to the second curved portion. 16. The extrusion die of any of any EXAMPLE herein, where no more than one third of a dimension of the front-end surface extending from a back-end surface to the front line of the primary manifold is linear. 15. The extrusion die of any of any EXAMPLE herein, where the front-end inner surface includes a linear portion that extends from the first curved portion to the second curved portion.

One EXAMPLE includes: EXAMPLE 17. An extrusion die includes a first die body and a second die body that define an extrusion cavity therebetween, the extrusion cavity having: an inlet; a primary manifold that extends from the inlet along a flow direction, the primary manifold having a back end portion, and a front end portion that extends from the back end portion along the flow direction, the front end portion being defined by opposing front-end inner surfaces of the first and second die body, respectively, at least one of the opposing front-end inner surfaces tapering towards the other of the front-end inner surfaces as it extends along the flow direction, the at least one of the opposing front-end inner surfaces having a first curved portion that extends from the back end portion towards a front line of the primary manifold, and a second curved portion that extends from the front line towards the back end portion; and an outlet in fluid communication with the primary manifold along the flow direction, the outlet defining a slot that is elongate along the second direction.

The above-noted EXAMPLE may further include any one or a combination of more than one of the following EXAMPLES: 18. The extrusion die of any EXAMPLE herein, where the first curved portion is curved concavely inwards towards the extrusion cavity as the first curved portion extends towards the front line. 19. The extrusion die of any of any EXAMPLE herein, where the first curved portion has a radius of curvature that varies as the first curved portion extends outwardly towards first and second ends of the extrusion die. 20. The extrusion die of any EXAMPLE herein, where the radius of curvature of the first curved portion increases as the first curved portion extends outwardly towards the first and second ends of the extrusion die. 21. The extrusion die of any of any EXAMPLE herein, where the second curved portion curves convexly outwards away from the extrusion cavity as the second curved portion extends towards the back end portion of the primary manifold. 22. The extrusion die of any EXAMPLE herein, where the second curved portion can have a radius of curvature that varies as the second curved portion extends outwardly towards the first and second ends of the extrusion die. 23. The extrusion die of any EXAMPLE herein, where the radius of curvature of the second curved portion increases as the second curved portion extends outwardly towards the first and second ends of the extrusion die. 24. The extrusion die of any of any EXAMPLE herein, where the first and second curved portions are tangent to one another. 25. The extrusion die of any of any EXAMPLE herein, where the first and second curved portions are adjoined to one another such that the front-end inner surface is continuously curved from the back end portion to the front line of the primary manifold without any linear portion extending from the first curved portion to the second curved portion. 27. The extrusion die of any of any EXAMPLE herein, where no more than one third of a dimension of the front-end surface extending from a back-end surface to the front line of the primary manifold is linear. 26. The extrusion die of any of any EXAMPLE herein, where the front-end inner surface includes a linear portion that extends from the first curved portion to the second curved portion.

It should be noted that the illustrations and descriptions of the examples shown in the figures are for exemplary purposes only, and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

While certain examples have been described, these examples have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the invention from including two or more, up to all, of the features. For instance, reference to a device having or defining "one of a X and Y" does not foreclose the device from having both the X and Y.

What is claimed:

1. An extrusion die, comprising:
a first die body and a second die body that define an extrusion cavity therebetween, the extrusion cavity having:
an inlet;
a primary manifold that extends from the inlet along a flow direction, the primary manifold having a back line, and a front line that is spaced from the back line along the flow direction, the back line being substantially linear along a second direction, perpendicular to the flow direction, as the back line extends outwards towards first and second ends of the extrusion die that are spaced from one another along the second direction, and the front line being tapered towards the back line as the front line extends outwards towards the first and second ends;
an intermediate chamber that extends from the primary manifold along the flow direction, the intermediate chamber having a back line that is coextensive with the front line of the primary manifold, and a front line that is spaced from the back line of the intermediate chamber along the flow direction, the front line of the intermediate chamber being tapered away from the back line of the intermediate chamber as the front line of the intermediate chamber extends outwards towards the first and second ends, and the intermediate chamber having a depth along a third direction, perpendicular to the flow direction and the second direction, that is less than a depth of the primary manifold; and
an outlet in fluid communication with the primary manifold and the intermediate chamber, the outlet defining a slot that is elongate along the second direction.

2. The extrusion die of claim 1, wherein the intermediate chamber has a cross-sectional shape of a bowtie in a plane that is perpendicular to the third direction.

3. The extrusion die of claim 1, wherein the extrusion cavity comprises a preland that has a preland back line, and a preland front line that is offset from the preland back line along the flow direction, the preland back line being coextensive with the front line of the intermediate chamber, and the preland back line tapering towards the preland front line as the preland back line extends outwards towards the first and second ends of the extrusion die, the preland having a depth along the third direction that is less than the depth of the intermediate chamber.

4. The extrusion die of claim 3, wherein the preland front line is linear along the second direction as the preland front line extends outwards towards the first and second ends of the extrusion die.

5. The extrusion die of claim 4, the extrusion cavity comprises a secondary manifold that has a back line, and a front line that is offset from the back line of the secondary manifold along the flow direction, the back line of the secondary manifold being coextensive with the front line of the preland, and the front line and the back line of the secondary manifold each being linear along the second direction as they extend outwards towards the first and second ends of the extrusion die, the secondary manifold having a depth along the third direction that is greater than the depth of the preland.

6. The extrusion die of claim 1, wherein the primary manifold has a back end portion, and a front end portion that extends from the back end portion along the flow direction, the front end portion being defined by opposing front-end inner surfaces of the first and second die body, respectively, at least one of the opposing front-end inner surfaces tapering towards the other of the front-end inner surfaces as it extends along the flow direction, the at least one of the opposing front-end inner surfaces having a first curved portion that extends from the back end portion towards a front line of the primary manifold, and a second curved portion that extends from the front line of the primary manifold towards the back end portion.

7. The extrusion die of claim 6, wherein the first curved portion is curved concavely inwards towards the extrusion cavity as the first curved portion extends towards the front line.

8. The extrusion die of claim 6, wherein the first curved portion has a radius of curvature that varies as the first curved portion extends outwardly towards the first and second ends of the extrusion die.

9. The extrusion die of claim 8, wherein the radius of curvature of the first curved portion increases as the first curved portion extends outwardly towards the first and second ends of the extrusion die.

10. The extrusion die of claim 6, wherein the second curved portion curves convexly outwards away from the extrusion cavity as the second curved portion extends towards the back end portion of the primary manifold.

11. The extrusion die of claim 10, wherein the second curved portion can have a radius of curvature that varies as the second curved portion extends outwardly towards the first and second ends of the extrusion die.

12. The extrusion die of claim 11, wherein the radius of curvature of the second curved portion increases as the second curved portion extends outwardly towards the first and second ends of the extrusion die.

13. The extrusion die of claim 6, wherein the first and second curved portions are tangent to one another.

14. The extrusion die of claim 6, wherein the first and second curved portions are adjoined to one another such that the front-end inner surface is continuously curved from the back end portion to the front line of the primary manifold without any linear portion extending from the first curved portion to the second curved portion.

15. The extrusion die of claim 6, wherein the front-end inner surface comprises a linear portion that extends from the first curved portion to the second curved portion.

16. The extrusion die of claim 6, wherein no more than one third of a dimension of a front-end surface extending from a back-end surface to the front line of the primary manifold is linear.

17. An extrusion die, comprising:
a first die body and a second die body that define an extrusion cavity therebetween, the extrusion cavity having:
an inlet;
a primary manifold that extends from the inlet along a flow direction, the primary manifold having a back end portion, and a front end portion that extends from the back end portion along the flow direction, the front end portion being defined by opposing front-end inner surfaces of the first and second die body, respectively, at least one of the opposing front-end inner surfaces tapering towards the other of the front-end inner surfaces as it extends along the flow direction, the at least one of the opposing front-end inner surfaces having a first curved portion that extends from the back end portion towards a front line of the primary manifold, and a second curved portion that extends from the front line towards the back end portion;

an intermediate chamber that extends from the primary manifold along the flow direction, the intermediate chamber having a back line that is coextensive with the front line of the primary manifold, and a front line that is spaced from the back line of the intermediate chamber along the flow direction, the front line of the intermediate chamber being tapered away from the back line of the intermediate chamber as the front line of the intermediate chamber extends outwards towards first and second ends, and the intermediate chamber having a depth along a third direction, perpendicular to the flow direction and a second direction, that is less than a depth of the primary manifold; and an outlet in fluid communication with the primary manifold along the flow direction, the outlet defining a slot that is elongate along the second direction perpendicular to the flow direction.

18. The extrusion die of claim 17, wherein the first curved portion is curved concavely inwards towards the extrusion cavity as the first curved portion extends towards the front line.

19. The extrusion die of claim 17, wherein the first curved portion has a radius of curvature that varies as the first curved portion extends outwardly towards first and second ends of the extrusion die.

20. The extrusion die of claim 19, wherein the radius of curvature of the first curved portion increases as the first curved portion extends outwardly towards the first and second ends of the extrusion die.

21. The extrusion die claim 19, wherein the second curved portion curves convexly outwards away from the extrusion cavity as the second curved portion extends towards the back end portion of the primary manifold.

22. The extrusion die of claim 21, wherein the second curved portion can have a radius of curvature that varies as the second curved portion extends outwardly towards the first and second ends of the extrusion die.

23. The extrusion die of claim 22, wherein the radius of curvature of the second curved portion increases as the second curved portion extends outwardly towards the first and second ends of the extrusion die.

24. The extrusion die of claim 17, wherein the first and second curved portions are tangent to one another.

25. The extrusion die of claim 17, wherein the first and second curved portions are adjoined to one another such that the front-end inner surface is continuously curved from the back end portion to the front line of the primary manifold without any linear portion extending from the first curved portion to the second curved portion.

26. The extrusion die of claim 17, wherein the front-end inner surface comprises a linear portion that extends from the first curved portion to the second curved portion.

27. The extrusion die of claim 17, wherein no more than one third of a dimension of a front-end surface extending from a back-end surface to the front line of the primary manifold is linear.

* * * * *